(12) United States Patent
Wilkinson, III

(10) Patent No.: US 10,207,371 B1
(45) Date of Patent: Feb. 19, 2019

(54) METHODS AND SYSTEMS FOR MAKING POISON PADS

(71) Applicant: HANGER & PIPE ACCESSORIES, INC., Brazoria, TX (US)

(72) Inventor: Joseph Wilkinson, III, Brazoria, TX (US)

(73) Assignee: HANGER & PIPE ACCESSORIES, INC., Brazoria, TX (US)

( * ) Notice: Subject to any disclaimer, the term of this patent is extended or adjusted under 35 U.S.C. 154(b) by 274 days.

(21) Appl. No.: 15/264,491

(22) Filed: Sep. 13, 2016

(51) Int. Cl.
F16L 3/00 (2006.01)
B23K 35/00 (2006.01)
B21D 22/02 (2006.01)
B23K 103/04 (2006.01)
B23K 103/18 (2006.01)

(52) U.S. Cl.
CPC ............ *B23K 35/004* (2013.01); *B21D 22/02* (2013.01); *B23K 2103/05* (2018.08); *B23K 2103/18* (2018.08)

(58) Field of Classification Search
CPC .............. B23K 35/004; B23K 2103/18; B23K 2103/05; B23K 2203/18; B23K 2203/05; B21D 22/02
See application file for complete search history.

(56) References Cited

U.S. PATENT DOCUMENTS

| | | | |
|---|---|---|---|
| 4,603,806 A | 8/1986 | Watanabe et al. | |
| 5,119,552 A * | 6/1992 | Sutou | B21C 37/0815 29/890.052 |
| 5,749,548 A * | 5/1998 | Tamura | F16L 3/18 248/176.2 |
| 7,780,800 B2 | 8/2010 | Takahashi et al. | |
| 8,113,802 B2 | 2/2012 | Liang et al. | |
| 2005/0166485 A1 | 8/2005 | Sugimoto et al. | |

* cited by examiner

*Primary Examiner* — Jun S Yoo
(74) *Attorney, Agent, or Firm* — Elliott & Polasek, PLLC; Douglas H. Elliott; Nathan Q. Huynh

(57) ABSTRACT

One or more specific embodiments herein includes a method for making a poison pad configured to be coupled to a pipe elbow joint, comprising providing or obtaining a die. The die comprises a first die portion, a second die portion, and an insert die portion providing or obtaining a blank, positioning the insert die portion between the first die portion and the second die portion, positioning the blank between either the first die portion and the insert die portion or the insert die portion and the second die portion, and pressing the blank between the first die portion and the second die portion such that the shape of the blank corresponds to one or more of the first die portion, second die portion, and insert die portion to form the poison pad or a precursor structure to become the poison pad.

19 Claims, 7 Drawing Sheets

METHODS AND SYSTEMS FOR MAKING POISON PADS

BACKGROUND

1. Field of Inventions

The field of this application and any resulting patent is methods and systems for making poison pads.

2. Description of Related Art

Poison pads are generally placed between a metal pipe and metal supporting structure to prevent the metal pipe from fusing with a different type of metal during welding. The welding process liquefies the base material (e.g., the metal pipe) in addition to the material being coupled (e.g., the supporting structure). When welding two different types of metals together, the two metals are heated and fused together to form a strong bond. Therefore, it is likely that the base material will be contaminated with the added material. For example, welding carbon steel to stainless steel is likely to introduce carbon into the stainless steel structure. To avoid galvanic corrosion of a pipe inadvertently comprising two different types of metal, a poison pad is used as a "buffer" between the pipe and the supporting structure. The poison pad comprising the same metal as the pipe is coupled to the pipe where the support structure will be added. The support structure is welded to the poison pad rather than to the pipe directly. This patent describes a novel and nonobvious method for manufacturing poison pads.

Various methods and devices have been proposed and utilized for making poison pads, including the methods and devices disclosed in the references appearing on the face of this patent. However, these methods and devices lack all the steps or features of the methods and devices covered by the patent claims below. Furthermore, the methods and devices covered by at least some of the claims of this issued patent solve many of the problems that prior art methods and devices have failed to solve. Also, the methods and devices covered by at least some of the claims of this patent have benefits that could be surprising and unexpected to a person of ordinary skill in the art based on the prior art existing at the time of invention.

SUMMARY

One or more specific embodiments herein includes a method for making a poison pad configured to be coupled to a pipe elbow joint, comprising providing or obtaining dimensions for a pipe elbow joint to be coupled to the poison pad, providing or obtaining a blank having dimensions corresponding to the pipe elbow joint, positioning the blank between a first die portion and a second die portion, and pressing the blank between the first die portion and the second die portion to form the poison pad or a precursor structure, wherein the poison pad is capable of being coupled to the pipe elbow joint.

One or more specific embodiments herein includes a method for making a poison pad configured to be coupled to a pipe elbow joint, comprising providing or obtaining a die, wherein the die comprises a first die portion, a second die portion, and an insert die portion, providing or obtaining a blank, positioning the insert die portion between the first die portion and the second die portion, positioning the blank between either the first die portion and the insert die portion or the insert die portion and the second die portion, and pressing the blank between the first die portion and the second die portion such that the shape of the blank corresponds to one or more of the first die portion, second die portion, and insert die portion to form the poison pad or a precursor structure to become the poison pad, wherein at least one of the first die portion, the second die portion, and the insert die portion is sized to correspond to at least one dimension of a pipe elbow joint.

One or more specific embodiments herein includes a method for making a poison pad comprising obtaining dimensional information on the poison pad, obtaining a die, wherein the die comprises a concave surface and a convex surface, positioning the blank between the concave surface and the convex surface, pressing the blank between the concave surface and the convex surface to form the poison pad or a precursor structure to become the poison pad, and providing the poison pad to an entity; wherein the poison pad is capable of coupling to an outer surface of a pipe elbow joint.

DETAILED DESCRIPTION

1. Introduction

Figure 1:
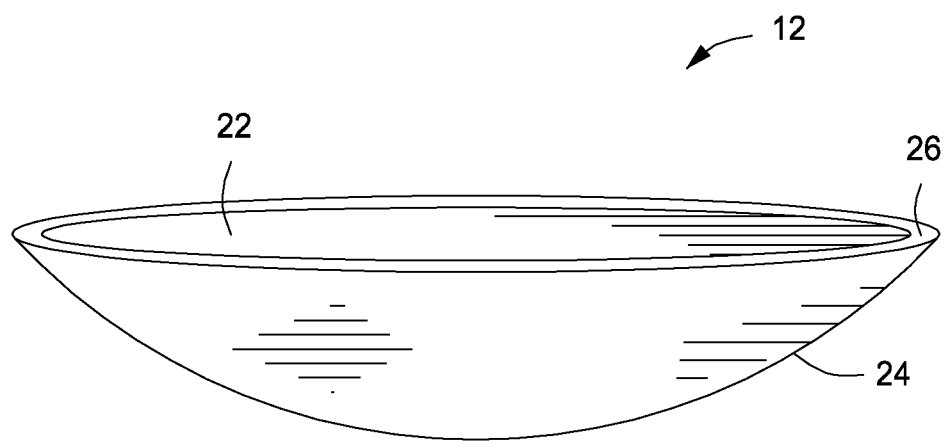
FIG. 1 is a perspective view of an embodiment of a poison pad from the side.

A detailed description will now be provided. The purpose of this detailed description, which includes the drawings, is to satisfy the statutory requirements of 35 U.S.C. § 112. For example, the detailed description includes a description of the inventions and sufficient information that would enable a person having ordinary skill in the art to make and use the inventions defined by the claims. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details of the systems, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in printed publications, dictionaries, or issued patents.

2. Selected Definitions

Certain claims include one or more of the following terms which, as used herein, are expressly defined below.

With reference to distance or dimension measurements, the term "substantially equal" means 0.1 inches or less. With references to angles, the term "substantially equal" means 1 degrees or less.

The term "corresponds to" as used herein is defined as related to or associated with, e.g., be similar, analogous, or equivalent to. For example, a blank may be shaped to correspond to a die portion when the pressing surface of the die portion presses against and plastically deforms the blank; the curve of the pressing surface will substantially match the curve of the blank surface after pressing. An insert die portion may be sized to correspond to a dimension of a pipe elbow joint when the thickness of the insert die portion is substantially equal to or determined from the difference in thickness between two different pipe schedules, e.g., the difference in thickness between a schedule 10 pipe and a schedule 40 pipe. A surface may correspond or be curved to correspond to an arc of a circle when the arc of that circle would fit on the curved surface and all points of the arc would be found on the curved surface. A surface may correspond or be curved to correspond to an arc of a circle when an arc drawn along the surface and connecting two opposing points on the edge of the surface is substantially equal to the arc of the circle. A surface may be capable of corresponding to more than one arc of more than one circle. For example, a major arc of a curved surface may correspond to a first arc of a first circle and a minor arc of the curved surface may correspond to a second arc of a second circle; the minor arc and major arc may be perpendicular to one another.

The term "modify" as used herein is defined as the verb "change" in its broadest sense. For example, modifying something includes changing somewhat or drastically, e.g., the form or qualities of something. For example, a pressing surface of a die may be modified such that the pressing surface prior to modification has a major arc corresponding to a first circle, and after modification, the pressing surface has a major arc corresponding to a second circle (i.e., the longitudinal curve of the rounded pressing surface is more or less curved after being modified).

The term "poison pad" as used herein is defined as a bowl-shaped article made of metal, preferably a metal alloy, preferably shaped to be capable of being coupled to a pipe elbow joint, e.g., by being welded to the outer surface of a pipe elbow joint. A poison pad may be formed from a flat sheet of material. A poison pad may be formed from a curved material, e.g., a blank formed into a curved shape (precursor structure) with a die that undergoes further modification to form the poison pad.

The term "pipe elbow joint" as used herein is defined as a hollow tubular section that is preferably bent such that two pipes attached to the pipe elbow joint have axes that are angled with respect to one another. For example, two pipes connected to a 90 degree elbow joint may have axis that are angled 90 degrees from each other. The pipe elbow joint is preferably a conduit and thus may be used to create a fluid connection between two different pieces of pipe that it connects. A pipe elbow joint has dimensions that are preferably obtained in accordance with certain embodiments disclosed herein, which dimensions may include an inner diameter, an outer diameter, a wall thickness (pipe schedule), and length, including outer length along the outside of the elbow and inner length along with inside of the elbow. A pipe elbow joint may be capable of being coupled to a poison pad. For example, a poison pad may be welded to a pipe elbow joint. A pipe elbow joint may comprise one or more different metals or other materials, e.g., a metal alloy. A pipe elbow joint may have the same composition as a poison pad to be coupled to the pipe elbow joint. A pipe elbow joint may comprise an outer surface and an inner surface. A pipe elbow joint may be formed from a straight pipe, e.g., by bending or rolling the straight pipe.

The term "coupled" as used herein is defined as attached, joined to, fastened together, or affixed to, directly or indirectly. An object may be coupled to another object by, for example, welding, gluing, screwing, etc. A poison pad may be coupled to an outer surface of a pipe elbow joint covering the outer portion of the curve of the pipe elbow joint (sometimes referred to as the elbow) as opposed to the inner portion of the curve (sometimes referred to as the crook).

The term "blank" as used herein is defined as an object to be made into something by a further operation. In the specific context of the technology described herein, a blank is a metal object made of a material capable of plastic deformation upon application of pressure greater than 10 psi. A blank may comprise metal such as stainless steel or another metal alloy. A blank may be a flat oblong sheet capable of being formed into a bowl-shaped object, e.g., a poison pad or another type of bowl-shaped metal pad. A blank may be formed into a poison pad by applying deforming pressure to the blank using a die. A poison pad may be prepared such that additional operations are needed after pressing the blank using a die to form the final poison pad. A blank may be capable of being positioned on a die and between two portions of a die, e.g., between a convex die surface and a concave die surface. A blank may comprise a material capable of plastic deformation upon application of pressure greater than 10 psi.

The term "positioning" as used herein is defined as putting in a particular place, arrangement, and/or orientation. A blank may be positioned between two die portions such that when pressure is applied to the blank by the two die portions, the blank is formed into a desired bowl-shaped structure, e.g., a poison pad. A blank may be positioned on a die such that a longer edge of the blank is closest to a longer side of the die. An insert die portion may be positioned between two die portions such that when the two die portions are brought together, the two die portions apply pressure on two different sides of the insert die portion. A blank may be positioned between a concave surface of a die and a convex portion of the die such that, when the convex portion of the die is pressed against the concave portion of the die, the blank is deformed to curve in a manner corresponding to the concave and convex surfaces.

The term "press" when used herein as a verb is defined as apply force or pressure. The term "pressing" when used herein as an adjective is defined as something capable of applying force or pressure. An object may be pressed between two die portions when the two die portions apply pressure in substantially opposite directions simultaneously. Two die portions pressing against an object may cause that object to plastically deform into a shape that corresponds to at least one of the die portions. A pressing surface is a surface used to apply pressure on an object. A single surface may have both a pressing surface and a non-pressing surface; the pressing surface would be the area of the surface that contacts another object at some point when applying pressure, and the non-pressing surface would be the remaining area of the surface. A pressing surface may be flat, curved, pointed, or any other shape as necessary.

The term "precursor structure" as used herein is defined as any physical object capable of being modified. A blank may be a precursor structure capable of being modified into a poison pad. A precursor structure may be modified to form another precursor structure; for example, a blank (a first precursor structure) may be modified to form a curved structure (a second precursor structure) which may be further modified to form a poison pad.

The terms "insert die portion" and "insert" as used herein are defined as a portion of a die used to press an object which portion is preferably removable and/or adjustable. An insert die portion may be used to change the dimensions of one or more pressing surfaces of a die from being capable of forming a poison pad for a first schedule of pipe of a specific diameter to being capable of forming a poison pad for a second schedule or pipe at the same diameter. An insert die portion may have a specified thickness corresponding to the difference in thickness between two schedules of pipe having the same outer diameter.

The term "die portion" as used herein is defined as a section, piece, part, feature, or element of a die. A die portion may comprise one or more pressing surfaces used to form a blank into a particular shape. A die portion may comprise half of a two-piece die which, when the two pieces are pressed against one another, forms a blank into a particular shape. A die portion may comprise a piece of a multi-part die. A die portion may comprise a surface of a die.

The term "surface" as used herein is defined as any face of a body or thing. A surface may be flat or curved, or irregular or bumpy. An outer surface of a pipe elbow joint may be the surface of the pipe that does not contact fluids transferred in the pipe when the pipe is installed in a pipeline. A pressing surface may comprise a flat or curved surface that is used to shape another object when pressure is applied on that object by the pressing surface. A pressing surface may have a flat portion and a curved portion. A pressing surface may have only curved surfaces. A pressing surface may be continuous with a non-pressing surface, such that a pressing surface and a non-pressing surface can be considered to be a single surface, but only a portion of that single surface is used to apply pressure to another object. A blank may comprise two flat surfaces that are opposite one another. For example, a rectangular sheet of metal has 6 surfaces, 4 that are much thinner than the other 2 surfaces. The two thicker surfaces may be substantially flat prior to pressing, e.g., may curve or bend less than 1, 5, 10, 15, 20, 30, or 45 degrees.

The term "groove" as used herein is defined as opening, slot, or channel of any shape or dimension, and is preferably elongated. A groove may serve as a guide for an object having a protrusion that fits within the groove, e.g., such that the protrusion may only move where the groove is present. A groove may comprise an opening that passes entirely through a wall of an object, e.g., from an outer surface to an inner surface. Alternatively, a groove in a surface of an object may have a bottom. A groove may comprise an indentation or notch on a surface of an object. Grooves may have different shapes and geometries. A groove may be used to position a first structure comprising the groove with a second structure comprising a corresponding protrusion.

The term "protrusion" as used herein is defined as something raised above a surface. A protrusion may comprise a section of a surface that extends above the flat or curved shape of the surface. A protrusion may comprise an object coupled to the surface of an object. A protrusion may comprise an extension that extends out of an object. A protrusion may extend off a pressing surface of a die portion. A protrusion may extend of a non-pressing surface of a die portion. A die may comprise more than one protrusion. A protrusion may be present on one or more die portions. A protrusion may be capable of fitting in or against a slot or groove.

The term "orienting" as used herein is defined as placing or assisting in placing in a particular position or direction, or being used to so place or so assist in placing. A protrusion on a die portion may be capable of orienting the die portion because the protrusion may be required to fit against or in a particular place with respect to the rest of the die. For example, a first protrusion on an insert die portion may be required to be positioned adjacent to a second protrusion on another die portion, which causes the insert die portion to be oriented in a particular manner with respect to the other die portion.

The term "between" as used with regard to position is defined as occupying the space or interval that separates, or more broadly being in intermediate relation to spacially or functionally. For example, a point is positioned between two other objects if a line connecting any surface of the first object to the second object passes through the point. An object positioned between two surfaces would be intersected at least one line connecting a point on the first surface to a point on the second surface. The term "between" as used with regard to comparing objects is defined as serving to connect or unite in a relationship. For example, the difference in thickness between two objects involves comparing the thicknesses of the two objects. However, a joint elbow section is considered "between" two straight sections of pipe that are at right angles to one another because the joint elbow section provides an intermediate point for fluid passing from one pipe section to the other pipe section.

The term "shape" as used herein is defined as spatial form or contour. A metal sheet may have a flat shape, for example, such that it is capable of laying flush against another flat surface. A metal sheet may initially have a flat shape and may be capable of being pressed into a curved or bowl shape.

The term "concave" as used herein is defined as curved inward. A concave surface may be capable of contacting and pressing against a flat surface and causing the flat surface to curve such that the flat surface is now convex.

The term "convex" as used herein is defined as rounded outward. A convex surface may be capable of contacting and pressing against a flat surface and causing the flat surface to curve such that the flat surface is now concave.

The terms "aligning" and "aligned with" as used herein is defined as being positioned with respect to something else. A protrusion may be aligned with a groove or slot when the protrusion is positioned in the groove or slot. A groove or slot may be aligned with a protrusion when the protrusion is positioned in the groove or slot. A first protrusion may be aligned with a second protrusion when the first protrusion is positioned adjacent to the second protrusion.

The term "adjacent" as used herein is defined as nearby or directly or indirectly in contact with. A first protrusion may be positioned adjacent to a second protrusion when at least a portion of one face of the first protrusion is positioned against or near at least a portion of one face of the second protrusion. A protrusion may be positioned adjacent to a groove or slot when the protrusion is positioned at least partially in the groove or slot. When a protrusion on a first object is positioned adjacent to a protrusion of a second object, the movement of the first object with respect to the second object may be limited.

The term "with respect to" as used herein is defined as in reference to or has any discernible relationship to. A first object may be oriented with respect to a second object when the first object is placed facing a certain direction or in a certain position relative to the second object. For example, a first object may be positioned facing away from a second object while facing towards a third object and be positioned with respect to both the second and third objects.

The term "thickness" as used herein is defined as a dimension through an object between two opposed surfaces of the object. A hollow pipe may have a thickness corresponding to the width of the wall of pipe body. A schedule 10 pipe may have a thickness that is less than that of a schedule 40 pipe. An insert die portion may have a thickness corresponding to the difference in thickness between two different schedules of pipe. For example, adding the thickness of a schedule 10 pipe to the thickness of an insert die portion may give a sum that is substantially equal to the thickness of a schedule 40 pipe. A blank may comprise a sheet of metal having a certain thickness.

The term "curved" as used herein is defined as bent or formed into a curve. A surface may be curved if the surface does not have a completely flat face. A curved surface may be cylindrical, convex, or concave.

The term "circle" as used herein is defined as a line that is curved so that its ends meet and every point on the line is the same distance from the center.

The term "radius" as used herein is defined as the line segment extending from the center of a circle or sphere to the circumference or the length of that line segment.

The term "arc" as used herein is defined a curved line. An arc may comprise a portion of a line that forms a circle. An arc may connect two points on an edge of a curved surface and exist on the plane of the surface. An arc may begin at a point on an edge of a curved surface and extend perpendicularly from a line tangent to the edge at that point and run along the plane of the surface. A major arc may run along the curved surface and connect the two points furthest from one another on the edge of a surface on opposite ends of the surface. A minor arc may run along the curved surface and connect the two points that are closest to one another while still being on opposite ends of the surface. A minor arc and a major arc may extend from an edge of a surface such they extend perpendicularly from a line tangent to a starting point of the arc.

3. Certain Specific Embodiments

Now, certain specific embodiments are described, which are by no means an exclusive description of the inventions. Other specific embodiments, including those referenced in the drawings, are encompassed by this application and any patent that issues therefrom.

One or more specific embodiments herein includes a method for making a poison pad configured to be coupled to a pipe elbow joint, comprising providing or obtaining dimensions for a pipe elbow joint to be coupled to the poison pad, providing or obtaining a blank having dimensions corresponding to the pipe elbow joint, positioning the blank between a first die portion and a second die portion, and pressing the blank between the first die portion and the second die portion to form the poison pad or a precursor structure, wherein the poison pad is capable of being coupled to the pipe elbow joint.

One or more specific embodiments herein includes a method for making a poison pad configured to be coupled to a pipe elbow joint, comprising providing or obtaining a die, wherein the die comprises a first die portion, a second die portion, and an insert die portion, providing or obtaining a blank, positioning the insert die portion between the first die portion and the second die portion, positioning the blank between either the first die portion and the insert die portion or the insert die portion and the second die portion, and pressing the blank between the first die portion and the second die portion such that the shape of the blank corresponds to one or more of the first die portion, second die portion, and insert die portion to form the poison pad or a precursor structure to become the poison pad, wherein at least one of the first die portion, the second die portion, and the insert die portion is sized to correspond to at least one dimension of a pipe elbow joint.

One or more specific embodiments herein includes a method for making a poison pad comprising obtaining dimensional information on the poison pad, obtaining a die, wherein the die comprises a concave surface and a convex surface, positioning the blank between the concave surface and the convex surface, pressing the blank between the concave surface and the convex surface to form the poison pad or a precursor structure to become the poison pad, and providing the poison pad to an entity; wherein the poison pad is capable of coupling to an outer surface of a pipe elbow joint.

In any one of the methods or systems disclosed herein, the insert die portion may comprise at least a first groove or a first protrusion, and the first die portion, the second die portion, or both the first die portion and second die portion may comprise at least a second groove or a second protrusion, either of which may be capable of aligning with the first groove, the first protrusion, or both.

In any one of the methods or systems disclosed herein, the insert die portion may comprise a first protrusion, the die may comprise a second protrusion, and the first protrusion may be capable of orienting the insert die portion with respect to the die when the first protrusion is positioned adjacent to the second protrusion.

In any one of the methods or systems disclosed herein, the insert die portion may comprise a protrusion, the die may comprise a groove, and the protrusion may be capable of orienting the insert die portion with respect to the die when first protrusion is positioned in the groove.

In any one of the methods or systems disclosed herein, the blank may comprise a steel alloy.

In any one of the methods or systems disclosed herein, the pipe elbow joint may comprise schedule 10/40 pipe.

In any one of the methods or systems disclosed herein, the pipe elbow joint may be a 90 degree joint.

In any one of the methods or systems disclosed herein, the die may comprise a protrusion and a groove such that one of the protrusion or the groove may be positioned on the first die portion, the other of the protrusion or the groove may be positioned on the second die portion, and the protrusion may be capable of fitting within the groove.

In any one of the methods or systems disclosed herein, a thickness of the insert die portion may correspond to a difference in wall thickness between a first pipe schedule and a second pipe schedule.

In any one of the methods or systems disclosed herein, the insert die portion may have a thickness corresponding to a difference in pipe wall thicknesses between a schedule 40 pipe having the same outer diameter as a schedule 10 pipe.

In any one of the methods or systems disclosed herein, the insert die portion may have a thickness corresponding to a difference in pipe wall thicknesses between a schedule 20 pipe having the same outer diameter as a schedule 10 pipe.

In any one of the methods or systems disclosed herein, the insert die portion may have a thickness corresponding to a difference in pipe wall thicknesses between a schedule 80 pipe having the same outer diameter as a schedule 10 pipe.

In any one of the methods or systems disclosed herein, the first portion of the die and the second portion of the die may each comprise at least one pressing surface, and at least one of the pressing surfaces may be curved to correspond to a first arc of a first circle having a first specified radius.

In any one of the methods or systems disclosed herein, an outer surface of the pipe elbow joint may correspond to the first arc of the first circle.

In any one of the methods or systems disclosed herein, the pressing surface of the die may be capable of being modified to correspond to a second arc of a second circle having a second specified radius.

In any one of the methods or systems disclosed herein, the first portion of the die may comprise a curved pressing surface, the curved pressing surface may comprise a minor arc and a major arc that may be perpendicular to the minor arc, the minor arc may correspond to a first circle having a first radius; and the major arc may correspond to a second circle having a second radius.

In any one of the methods or systems disclosed herein, the first radius may be at least 30% longer than the second radius.

In any one of the methods or systems disclosed herein, the first portion of the die may comprise a convex pressing surface, the second portion of the die may comprise a concave pressing surface, and the convex pressing surface may be capable of engaging the concave pressing surface.

4. Specific Embodiments in the Figures

The drawings presented herein are for illustrative purposes only and are not intended to limit the scope of the claims. Rather, the drawings are intended to help enable one having ordinary skill in the art to make and use the claimed inventions.

Figure 2:
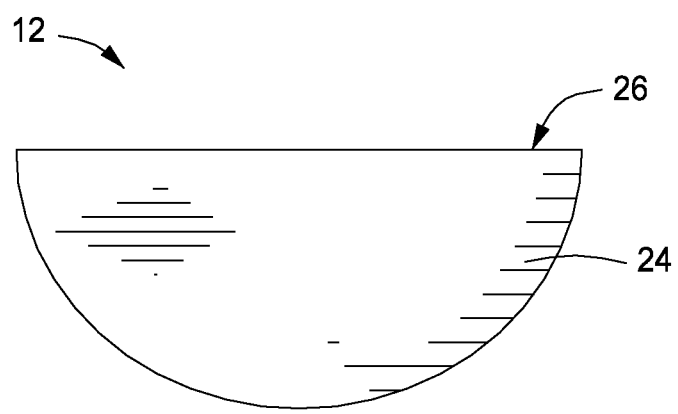
FIG. 2 is a perspective view of an embodiment of a poison pad from the front.

Referring to FIGS. 1-4, various depictions of a poison pad are illustrated, each of which has features any one of which may be found in various specific embodiments, including both those that are shown in this specification and those that are not shown. Referring to FIGS. 1 and 2, a poison pad standing alone is depicted. FIG. 1 shows a side view of the poison pad 12, while FIG. 2 shows the front view of the poison pad 12. A poison pad 12 may be formed from various types of metals, including metal alloys (e.g., Monel and stainless steel such as duplex steel). A poison pad 12 may be formed using a particular thickness of metal that may match the pipe to which it would be coupled (e.g., schedule 10 pipe, schedule 40 pipe). The inner surface 22 of the poison pad 12 may be shaped to conform to the outer surface of an elbow joint (14, FIG. 3) so that the poison pad 12 may be positioned adjacent to and pressed firmly against the outer surface of the elbow joint. The outer surface 24 of the poison pad 12 may be used as a mounting surface, for example, to couple to a brace (16, FIG. 3). The poison pad 12 may also be used to reinforce an elbow joint or pipe intersection. The thickness of the poison pad 12 may correspond to the width of the poison pad rim 26, and may depend on the thickness of material used to form the poison pad 12. An arc formed along a curved surface extending between the two points on the opposite edges of the curved surface that are farthest apart may be referred to herein as the major arc. An arc formed along a curved surface extending between the two points on the opposite edges of the curved surface that are closest together may be referred to herein as the minor arc. For example, the major arc of the inner surface 22 of the poison pad 12 formed for a 6-inch diameter, 90° elbow joint may correspond to a circle having a radius of 12.3125 inches. The minor arc formed along the inner surface 22 of the poison pad 12 formed for a 6-inch diameter, 90° elbow joint may correspond to a circle having a radius of 3.3125 inches. A major arc of the outer surface 24 of the poison pad 12 formed for a 6-inch diameter, 90° elbow joint of schedule 40 pipe may correspond to a circle having a radius of 12.525 inches. A major arc of the outer surface 24 of the poison pad 12 formed for a 6-inch diameter, 90° elbow joint of schedule 10 pipe may correspond to a circle having a radius of 12.4465 inches. A minor arc of the outer surface 24 of the poison pad 12 formed for a 6-inch diameter, 90° elbow joint of schedule 40 pipe may correspond to a circle having a radius of 3.5925 inches. A minor arc of the outer surface 24 of the poison pad 12 formed for a 6-inch diameter, 90° elbow joint of schedule 10 pipe may correspond to a circle having a radius of 3.445 inches.

Figure 3:
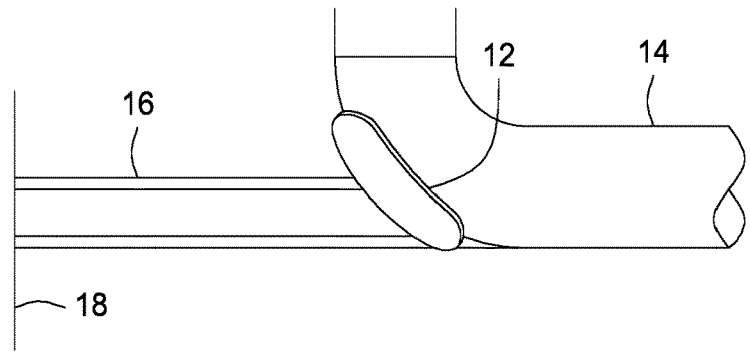
FIG. 3 is a side view of a depiction of an elbow joint coupled to a poison pad which is coupled to a horizontal support.
Figure 4:
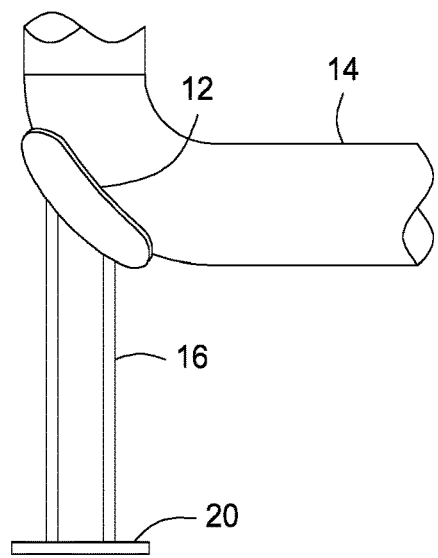
FIG. 4 is a side view of a depiction of an elbow joint coupled to a poison pad which is coupled to a vertical support.

Referring to FIGS. 3 and 4, a poison pad 12 coupled to an elbow joint 14 is depicted. A poison pad 12 preferably is made of the same material as the elbow joint 14 onto which it is coupled (e.g., welded). The poison pad 12 may be coupled to a brace 16 which may be horizontal (e.g., FIG. 3), vertical (e.g., FIG. 4), or an orientation between horizontal and vertical. The brace 16 may extend from a wall 18, or the brace 16 may extend from a base mount 20 coupled to the floor or ceiling. The brace 16 may extend from another brace (not pictured). The length of the brace 16 may be specified by the purchaser to meet the purchaser's custom needs. The length of the brace 16 may come in a number of standardized lengths. The brace 16 may be a different material from the poison pad 12.

Figure 5:
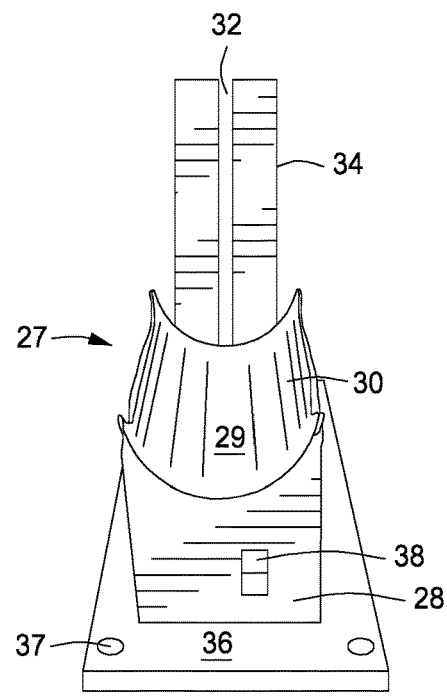
FIG. 5 is a perspective view of a lower assembly of an embodiment of a poison pad die from the front.
Figure 6:
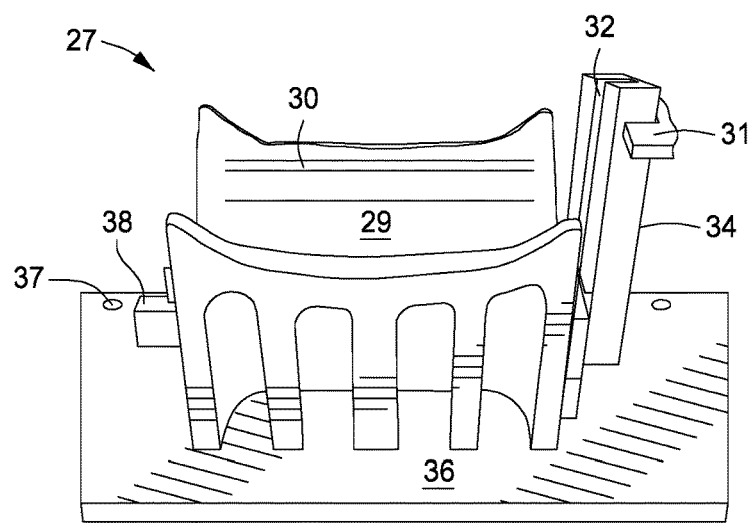
FIG. 6 is a perspective view of a lower assembly of an embodiment of a poison pad die from the side.

Referring to FIGS. 5-8, various depictions of top and bottom portions of a poison pad die are illustrated, each of which has features any one of which may be found in various specific embodiments, including both those that are shown in this specification and those that are not shown. It is understood that "top" and 'bottom" describes a die as shown in which the die portion with the convex surface is on the bottom closer to the ground and the die portion with the concave surface is on the top farther from the ground; however, the two die portions can be switched so that the die portion with the convex surface is on the top and the die portion with the concave portion is on the bottom. Referring to FIGS. 5 and 6, a lower assembly 27 of a poison pad die is depicted (lower die assembly). The lower die assembly 27 may comprise a bottom die portion 30 that may correspond to the outer surface of a poison pad that is being formed using a poison pad die such as the one disclosed herein. The bottom die portion 30 may be affixed to a base 36. The base 36 may be capable of being mounted to a pressing machine (FIG. 13) using holes 37. For example, the lower die assembly 27 may be secured to a pressing machine by positioning bolts (FIG. 13) in the holes 37 of the base 36 and securing the bolts to the pressing machine. A vertical guide 34 may be affixed to the bottom die portion 30 such that the guide 34 is stationary with respect to the rounded surface 29 bottom die portion 30. For example, the guide 34 may be mounted on the side of the bottom die portion 30 (as pictured). For example, the guide 34 may be affixed to the base 36 on which the bottom die portion 30 is affixed. The guide 34 may be capable of engaging a protrusion (56, FIG. 8) of an upper die assembly. In certain embodiments, the engagement of the protrusion in the upper die assembly may prevent or hinder the rotation or sideways shifting of the top die portion with respect to the bottom die portion 30 when the top die portion is pressed against the bottom die portion 30. The guide 34 may comprise a slot 32 formed between two elongated structures, the slot 32 having a width that is equal to or slightly larger than the corresponding protrusion (56, FIG. 8). For example, the slot 32 may be 0.755 inches wide, and the protrusion (56, FIG. 8) may be 0.750 inches wide. The lower die assembly 27 may comprise a protrusion 38 which may be used to align a die insert with respect to the bottom die portion 30 (see discussion, FIGS. 11 and 12). The guide 34 may comprise a brace structure 31 that connects the two elongated structures of the guide 34 such that the width of the slot 32 does not change vertically. The lower die assembly 27 may either be a unitary structure that includes a guide 34, a bottom die portion 30, and a base 36 as well as other elements described elsewhere herein; or the lower die assembly 27 may alternatively be a combination of those separate structures which may be coupled to one another, but in either case such an assembly necessarily includes at least a bottom or lower die surface 29. The minor arc of the inner surface 29 of the bottom die portion 30 used in forming a poison pad for a 6-inch diameter, 90° elbow joint may correspond to a circle having a radius of 3.5925 inches. The major arc of the inner surface 29 of the bottom die portion 30 used in forming a poison pad for a 6-inch diameter, 90° elbow joint may correspond to a circle having a radius of 12.5925 inches.

Figure 7:
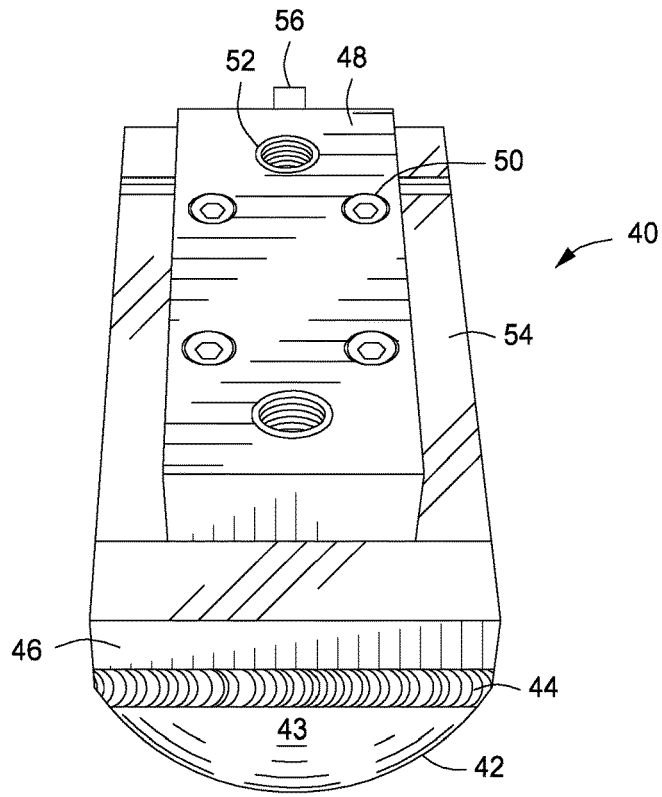
FIG. 7 is a perspective view of an upper assembly of an embodiment of a poison pad die from the front.
Figure 8:
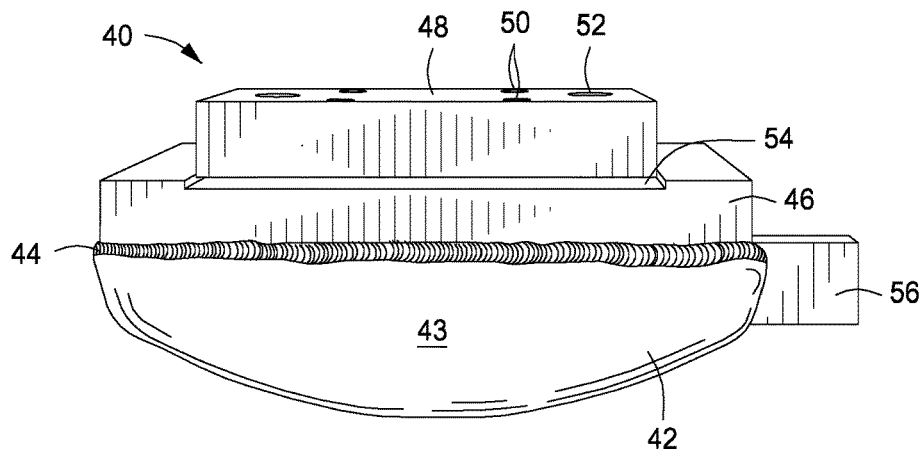
FIG. 8 is a perspective view of an upper assembly of an embodiment of a poison pad die from the side.

Referring to FIGS. 7 and 8, an upper assembly 40 of a poison pad die is depicted (upper die assembly). The upper die assembly 40 may include a top die portion 42 that has a top die surface 43 which is shaped to correspond to the inner surface of a poison pad (12, FIG. 1) that is formed using a poison pad die such as the die disclosed herein. The top die portion 42 may be coupled to a mounting plate 48 directly or indirectly. The mounting plate 48 may comprise two or more threaded holes 52 that may be used to couple the upper die assembly 40 to a pressing machine or a mounting block of a pressing machine (see FIG. 13). The mounting plate 48 may be coupled to the top die portion 42 using one or more bolts 50 that pass through the mounting plate 48 and into the top die portion 42. The mounting plate 48 may rest against an inset surface 54 which is part of the upper die assembly 40. A protrusion 56 may be used in concert with a guide (34, FIG. 5) to prevent rotation and/or slippage of the top die portion 42 when the upper die assembly 40 is pressed against a lower die assembly with a pressing machine. The top die portion 42 may include or be connected to a backing plate 46 with a weld 44. The upper die assembly 40 may either be a unitary structure including the protrusion 56, the bottom die portion 42, the backing plate 46, and the mounting plate 48 as well as other elements described elsewhere herein; alternatively, the upper die assembly 40 may be a combination of those separate structures which may be coupled to one another, but in either case such an assembly necessarily includes at least a top or upper die surface 43. The major arc of the rounded face 43 of the top die portion 42 used in forming a poison pad for a 6-inch diameter, 90° elbow joint may correspond to a circle having a radius of 12.3125 inches. The minor arc of the rounded face 43 of the top die portion 42 used in forming a poison pad for a 6-inch diameter, 90° elbow joint may correspond to a circle having a radius of 3.3125 inches.

Figure 9:
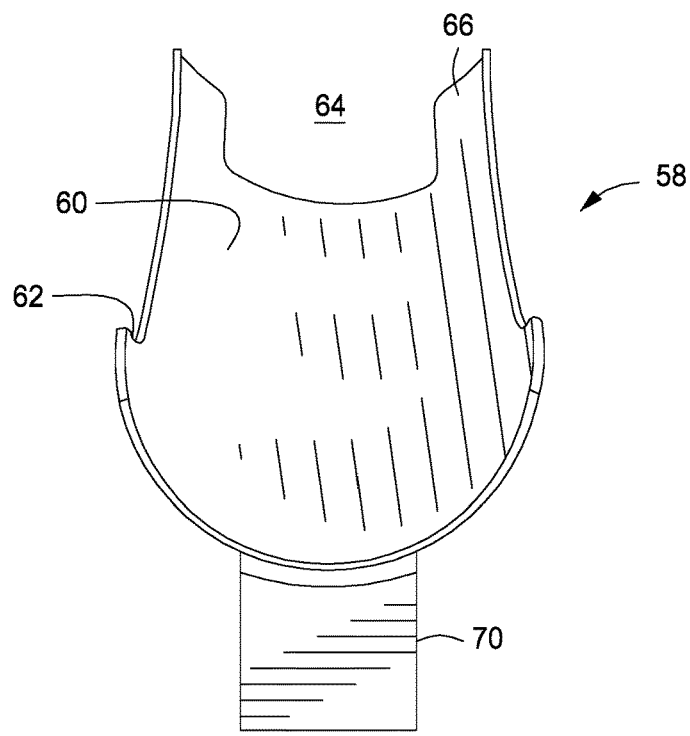
FIG. 9 is a perspective view of an embodiment of a poison pad die insert from the front.
Figure 10:
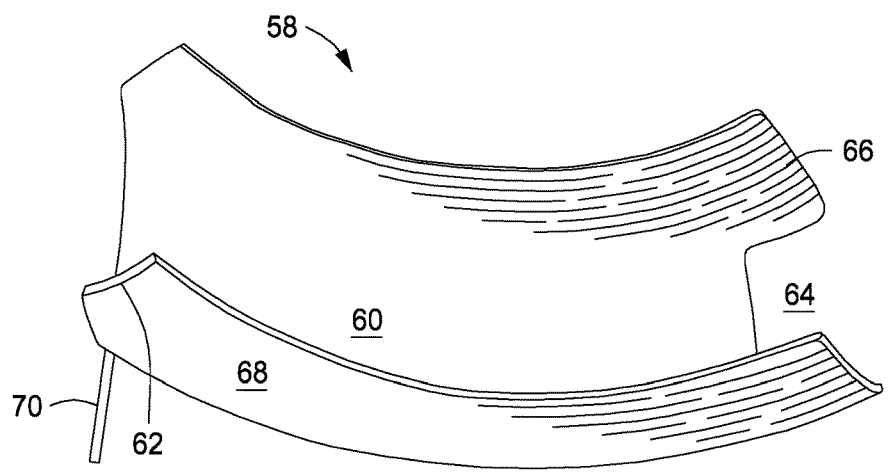
FIG. 10 is a perspective view of an embodiment of a poison pad die insert from the side.

Referring now to FIGS. 9-12, various depictions of a poison pad die insert (which is sometimes referred to herein simply as an "insert") are illustrated, each of which has features any one of which may be found in various specific embodiments, including both those that are shown in this specification and those that are not shown. Referring to FIGS. 9 and 10, a specific embodiment of a die insert 58 standing alone is depicted. The die insert 58 may have an inner surface 60 that is shaped to correspond to an outer surface of a poison pad (see FIG. 1) with differently shaped major and minor arcs. For example, the die insert 58 used in forming a poison pad for a 6-inch diameter, 90° elbow joint from schedule 10 pipe may comprise an inner surface 60 major arc corresponding to a circle having a radius of 3.445 inches and an inner surface 60 minor arc corresponding to a circle having a radius of 12.4465 inches. The die insert 58 may comprise a recess 64 formed between two extending surfaces 66 of the die insert 58. The recess 64 may be used to align the die insert 58 with the bottom die portion by positioning the extended surfaces 66 on either side of the guide (see FIG. 11). The die insert 58 may comprise a protrusion 70 that may be used to align the die insert 58 with the bottom die portion (see FIG. 11). The thickness of the die insert 58 may correspond to the difference in wall thicknesses between schedule 40 pipe and schedule 10 pipe of a particular diameter pipe. For example, the die insert 58 may have a thickness of 0.146 inches, which is the difference between the wall thickness of a 6-inch diameter, 90° elbow joint formed from schedule 40 pipe and a 6-inch diameter, 90° elbow joint formed from schedule 10 pipe. Corners of the die insert 58 may be rounded or trimmed (e.g., as seen in edge 62) to reduce the risk of injury due to sharp corners.

Figure 11:
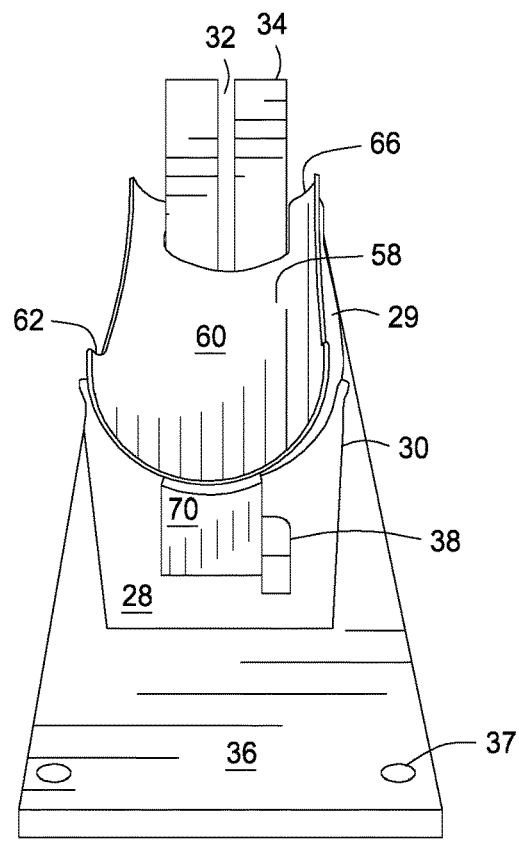
FIG. 11 is a perspective view of a die insert positioned on a lower assembly of a poison pad die from the front.
Figure 12:
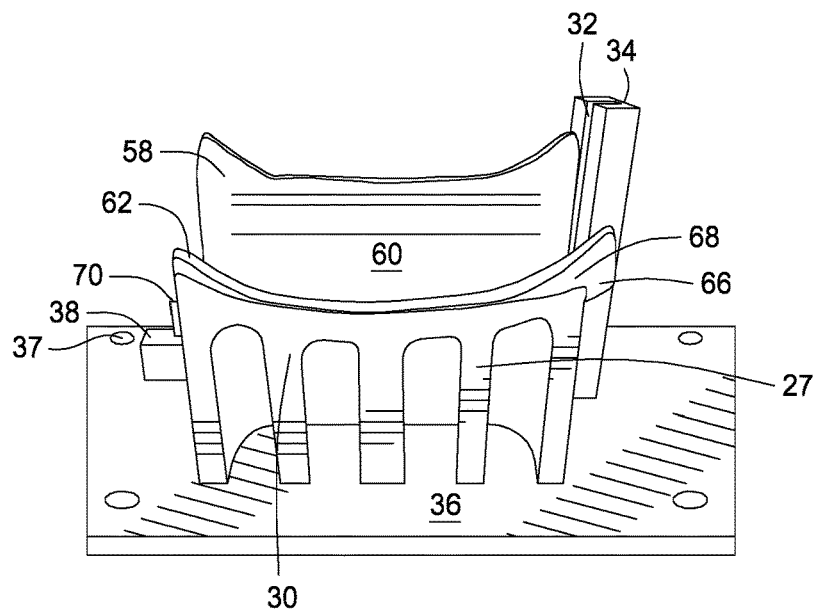
FIG. 12 is a perspective view of a die insert positioned on a lower assembly of a poison pad die from the side.

Referring to FIGS. 11 and 12, a specific embodiment of a poison pad die insert 58 positioned against a bottom portion 30 of a poison pad die is depicted. The die insert 58 may be positioned so the outer surface 68 of the die insert 58 is adjacent to the inner surface 29 of the bottom die portion 30. When positioned in the bottom die portion 30, the bottom surface 60 of the die insert 58 essentially replaces the bottom surface 29 of the bottom die portion of the die and becomes the bottom inner surface of the bottom or lower die assembly. Thus, the outer surface of any poison pad produced when the die insert 58 is positioned in the bottom die portion 30 preferably corresponds to the inner surface 60 of the die insert 58. The recess (64, FIG. 10) of the die insert 58 formed by extended surfaces 66 may be used to align the die insert 58 laterally with respect to the bottom die portion 30 when the guide 34 of the lower die assembly is positioned between the extended surfaces 66 of the die insert 58. The recess of the die insert 58 may have a width of 4.875 inches, and the guide 34 may have a width of 4.0 inches. The guide 34 and the extended surfaces 66 of the die insert 58 may substantially prevent the die insert 58 from rotating (prevent the die insert 58 from rotating more than 1, 2, 3, 4, 5, 6, or 7 degrees) with respect to the bottom die portion 27. The die insert 58 may also be aligned with respect to the bottom die portion 30 with the protrusion 70 of the die insert 58 and/or the protrusion 38 of the lower die assembly. For example, the protrusion 70 may prevent the die insert 58 from shifting longitudinally with respect to the bottom die portion 30 when the protrusion 70 contacts the side wall 28 of the bottom die portion 30. For example, the protrusion 70 may prevent the die insert from shifting side to side or rotating with respect to the bottom die portion 30 when the protrusion 70 of the die insert 58 comes into contact with the protrusion 38 coupled to the bottom die portion 30. The protrusion 70, the protrusion 38, the extended surfaces 66, and the guide 34 all may serve to prevent substantial movement of the die insert 58 with respect to the bottom die portion 30.

Figure 13:
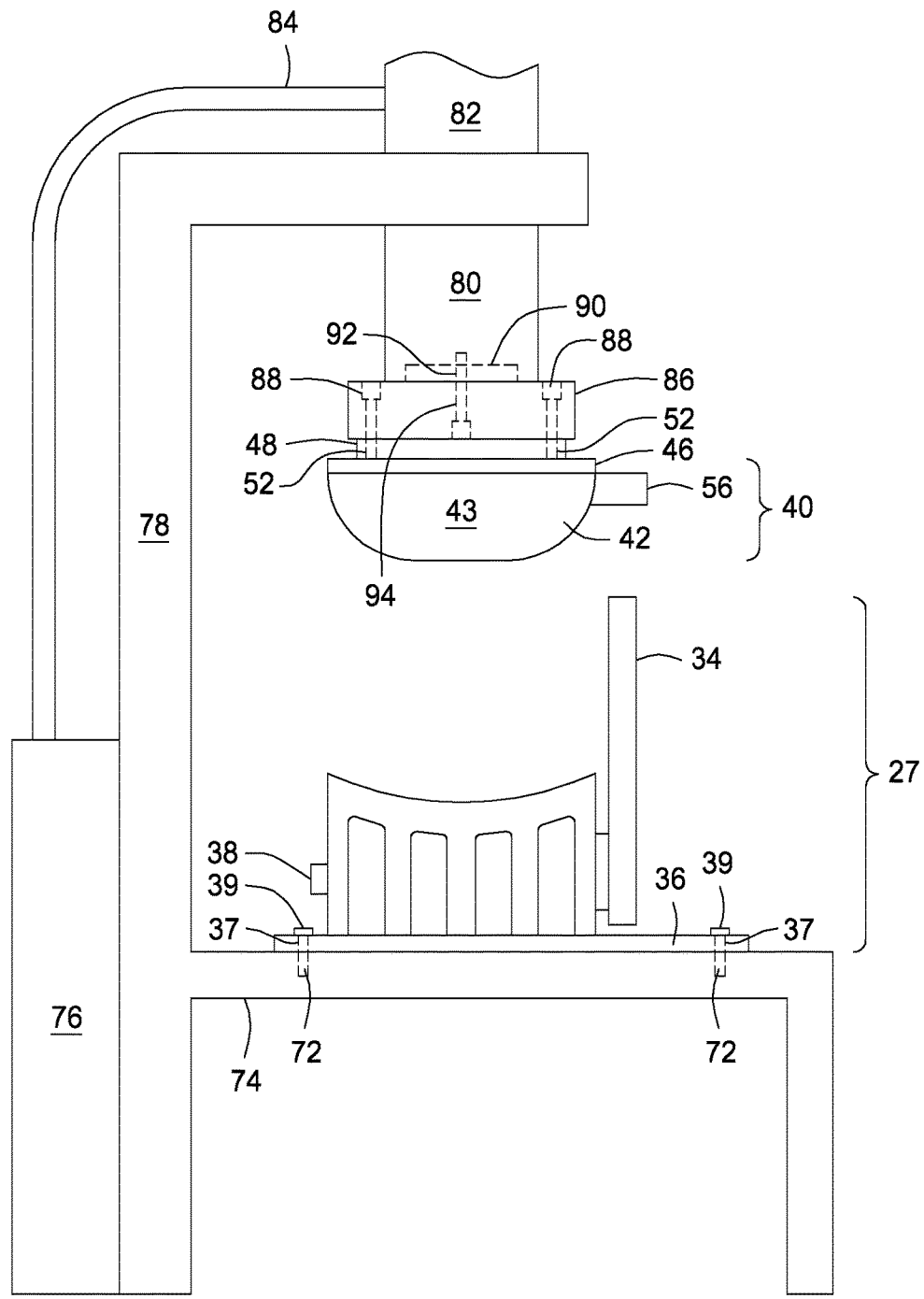
FIG. 13 is a side view of a depiction of an upper assembly and a lower assembly of an embodiment of a poison pad die coupled to a pressing machine.

Referring to FIG. 13, a specific embodiment depicted shows an upper assembly 40 and a lower assembly 27 of a poison pad die coupled to a worktable 74 and a piston 80, respectively, of a pressing machine. The upper assembly 40 may be coupled directly to the piston 80 (preferably the moving portion) of the pressing machine, or it may be coupled to an intermediate block 86 that is coupled to and moves with the piston 80 via bolt holes 92 and 94 (as pictured). The piston 80 may have an inset portion 90 with which a protruding portion of the intermediate block 86 fits. For example, a cylinder may extend from the intermediate block 86, and a cylindrical inset 90 is large enough to tightly fit the cylinder inside the inset 90 (e.g., a few thousand of an inch tolerance). The upper assembly 40 may be coupled to the intermediate block 86 via bolt holes 88 through the intermediate block 86 and into holes 52 in the mounting plate 48 of the upper assembly 40. The bolts may be arranged such that when screwed fully, the heads of the bolts are flush with the surface or below the surface. The bolts may comprise Allen bolts and may have a 1" diameter. The lower assembly 27 may be coupled directly or indirectly to the worktable 74 (preferably the nonmoving portion) of the pressing machine. The lower assembly 27 may be coupled to the worktable 74 by passing bolts 39 into the holes 37 through the base 36 and into holes 72 in the worktable 74 of the lower assembly 27.

When the upper assembly 40 is coupled to the piston 80 and the lower assembly 27 is coupled to the worktable 74 as described above, the protrusion 56 of the upper assembly 40 should be aligned with the slot of the guide 34 of the lower assembly 27. When aligned, the protrusion 56 may move vertically as controlled by the piston 80 into the slot of the guide 34 without needing lateral adjustment.

The press machine may function by producing force to move the piston 80 up and down relative to the body 78 and worktable 74 of the press machine. The press machine may move the piston 80 using hydraulic force by injecting and withdrawing fluid in areas of the fluid housing 82 of the press machine. Fluid movement may be controlled by a user electronically at a controller station 76. Fluid may pass through tube 84 when moving the piston 80. The piston 80 may recede into the fluid housing 82 when in a retracted position. When the piston 80 is in its fully extended state, the upper assembly 40 should be capable of pressing against the lower assembly 27 or insert (not shown) when no blank is positioned between the upper assembly 40 and the lower assembly 27.

What is claimed as the invention is:

1. A method for making a poison pad configured to be coupled to a pipe elbow joint, comprising:
   providing or obtaining first dimensions for a pipe elbow joint to be coupled to the poison pad;
   providing or obtaining a blank having second dimensions corresponding to the pipe elbow joint;
   positioning the blank between a first die portion and a second die portion; and
   pressing the blank between the first die portion and the second die portion to form the poison pad or a precursor structure, wherein the poison pad is capable of being coupled to the pipe elbow joint.

2. The method of claim 1 wherein the blank comprises a steel alloy.

3. The method of claim 1 wherein the pipe elbow joint comprises schedule 10/40 pipe.

4. The method of claim 1 wherein the pipe elbow joint is a 90 degree joint.

5. The method of claim 1 wherein:
   the first portion of the die and the second portion of the die each comprise at least one pressing surface, and
   at least one of the pressing surfaces is curved to correspond to a first arc of a first circle having a first specified radius.

6. The method of claim 1 wherein:
   the first portion of the die comprises a curved pressing surface;
   the curved pressing surface comprises a minor arc and a major arc that is perpendicular to the minor arc;
   the minor arc corresponds to a first circle having a first radius; and
   the major arc corresponds to a second circle having a second radius.

7. The method of claim 6 wherein the first radius is at least 30% longer than the second radius.

8. The method of claim 1 wherein:
   the first portion of the die comprises a convex pressing surface;
   the second portion of the die comprises a concave pressing surface; and
   the convex pressing surface is capable of engaging the concave pressing surface.

9. A method for making a poison pad configured to be coupled to a pipe elbow joint, comprising:
   providing or obtaining a die, wherein the die comprises a first die portion, a second die portion, and an insert die portion;
   providing or obtaining a blank;
   positioning the insert die portion between the first die portion and the second die portion;
   positioning the blank between either the first die portion and the insert die portion or the insert die portion and the second die portion; and
   pressing the blank between the first die portion and the second die portion such that the shape of the blank corresponds to one or more of the first die portion, second die portion, and insert die portion to form the poison pad or a precursor structure to become the poison pad; wherein at least one of the first die portion, the second die portion, and the insert die portion is sized to correspond to at least one dimension of a pipe elbow joint.

10. The method of claim 9 wherein:
the insert die portion comprises at least a first groove or a first protrusion; and
the first die portion, the second die portion, or both the first die portion and second die portion comprise at least a second groove or a second protrusion, either of which is capable of aligning with the first groove, the first protrusion, or both.

11. The method of claim 9 wherein:
the insert die portion comprises a first protrusion;
the die comprises a second protrusion; and
the first protrusion is capable of orienting the insert die portion with respect to the die when the first protrusion is positioned adjacent to the second protrusion.

12. The method of claim 9 wherein:
the insert die portion comprises a protrusion;
the die comprises a groove; and
the protrusion is capable of orienting the insert die portion with respect to the die when first protrusion is positioned in the groove.

13. The method of claim 9 wherein the die comprises a protrusion and a groove such that one of the protrusion or the groove is positioned on the first die portion, one of the protrusion of the groove is positioned on the second die portion, and the protrusion is capable of fitting within the groove.

14. The method of claim 9 wherein a thickness of the insert die portion corresponds to a difference in wall thickness between a first pipe schedule and a second pipe schedule.

15. The method of claim 9 wherein the insert die portion has a thickness corresponding to a difference in pipe wall thicknesses between a schedule 40 pipe having the same outer diameter as a schedule 10 pipe.

16. The method of claim 9 wherein the insert die portion has a thickness corresponding to a difference in pipe wall thicknesses between a schedule 20 pipe having the same outer diameter as a schedule 10 pipe.

17. The method of claim 9 wherein the insert die portion has a thickness corresponding to a difference in pipe wall thicknesses between a schedule 80 pipe having the same outer diameter as a schedule 10 pipe.

18. The method of claim 17 wherein an outer surface of the pipe elbow joint corresponds to the first arc of the first circle.

19. The method of claim 17 wherein the pressing surface of the die is capable of being modified to be capable of being modified to correspond to a second arc of a second circle having a second specified radius.

* * * * *

UNITED STATES PATENT AND TRADEMARK OFFICE
CERTIFICATE OF CORRECTION

PATENT NO. : 10,207,371 B1
APPLICATION NO. : 15/264491
DATED : February 19, 2019
INVENTOR(S) : Joseph Wilkinson, III Page 1 of 1

It is certified that error appears in the above-identified patent and that said Letters Patent is hereby corrected as shown below:

In the Claims

Column 14 Line 31 Claim 5, "each comprise" should read --each comprises--.

Column 16 Lines 24-25 Claim 19, "is capable of being modified to capable of being modified to correspond to" should read --is capable of being modified to correspond to--.

Signed and Sealed this
Twenty-second Day of October, 2019

Andrei Iancu
*Director of the United States Patent and Trademark Office*